(12) United States Patent
Tan et al.

(10) Patent No.: US 11,487,704 B2
(45) Date of Patent: Nov. 1, 2022

(54) METHOD, A DEVICE, AND A COMPUTER PROGRAM PRODUCT FOR ADJUSTING A STORAGE SPACE

(71) Applicant: EMC IP Holding Company LLC, Hopkinton, MA (US)

(72) Inventors: Jiang Tan, Chengdu (CN); Hao Wang, Chengdu (CN); Chaojun Zhao, Chengdu (CN); Hongyuan Zeng, Sichuan (CN); Yang Zhang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 228 days.

(21) Appl. No.: 16/883,159

(22) Filed: May 26, 2020

(65) Prior Publication Data

US 2021/0117376 A1    Apr. 22, 2021

(30) Foreign Application Priority Data

Oct. 21, 2019   (CN) .......................... 201911002087.5

(51) Int. Cl.
*G06F 16/10* (2019.01)
*G06F 16/11* (2019.01)
*G06F 3/06* (2006.01)
*G06F 9/50* (2006.01)

(52) U.S. Cl.
CPC .......... *G06F 16/122* (2019.01); *G06F 3/0607* (2013.01); *G06F 3/067* (2013.01); *G06F 3/0644* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 9,753,782 B2 | 9/2017 | Fang et al. | |
| 9,971,548 B1* | 5/2018 | Talwar | G06F 3/0613 |
| 10,250,673 B1* | 4/2019 | Brooker | H04L 67/1014 |
| 10,346,355 B2 | 7/2019 | Godman | |
| 10,579,272 B2 | 3/2020 | Tremblay et al. | |
| 10,606,625 B1* | 3/2020 | Belianski | G06F 3/0607 |
| 2011/0040731 A1* | 2/2011 | Gavade | H04N 21/42204 707/684 |
| 2014/0047208 A1* | 2/2014 | Morse | G06F 3/0605 711/E12.078 |
| 2018/0196608 A1* | 7/2018 | Ahmed | G06F 3/0622 |
| 2020/0104264 A1 | 4/2020 | Khandual et al. | |

* cited by examiner

*Primary Examiner* — Jau Shya Meng
(74) *Attorney, Agent, or Firm* — BainwoodHuang (57) ABSTRACT

Techniques for adjusting storage space involve: receiving a request for adjusting available storage space of a user in a filesystem from a first size to a second size; determining whether to allow to adjust the available storage space based on the request; and in response to allowing to adjust the available storage space, adjusting the available storage space to the second size. Accordingly, not only operations that an administrator needs to perform for adjusting the available storage space of a user is reduced, but also a quick and correct response for a request from a user of adjusting the available storage space is guaranteed.

21 Claims, 6 Drawing Sheets

METHOD, A DEVICE, AND A COMPUTER PROGRAM PRODUCT FOR ADJUSTING A STORAGE SPACE

CROSS-REFERENCE TO RELATED APPLICATION

This application claims priority to Chinese Patent Application No. CN201911002087.5, on file at the China National Intellectual Property Administration (CNIPA), having a filing date of Oct. 21, 2019, and having "A METHOD, A DEVICE, AND A COMPUTER PROGRAM PRODUCT FOR ADJUSTING A STORAGE SPACE" as a title, the contents and teachings of which are herein incorporated by reference in their entirety.

FIELD

Embodiments of the present disclosure generally relate to the field of data storage, and more specifically, to a method, device and computer program product for adjusting storage space.

BACKGROUND

In the field of data storage, a filesystem can be used by multiple different users simultaneously and accessed through a network. Therefore, the filesystem allocates available storage space to each user for storage space formed by the storage devices therein. The available storage space can also be referred to as the user storage space quota, which is used to limit maximum usage capacity of the storage space of each user on a filesystem. In the use of the filesystem, users may need to temporarily or permanently expand the available storage space along with business expansion, or they may need to temporarily or permanently shrink the available storage space of due to less overhead. In the above scenarios, there is a need to adjust available storage space of the users on a filesystem.

In conventional filesystems, the aforementioned adjustment needs to be performed manually by an administrator of the filesystem. That is, the administrator needs to manually receive a request from a user, adjust the available storage space of the user upon the request and restores the available storage space to an original size when an end time for the adjustment is reached for the temporary adjustment request. Obviously, it is inconvenient for an administrator to adjust the quota size manually per the project changes, especially when the filesystem has a large number of users and the administrator needs to handle a lot of the same and similar work. In addition, in order to expand available storage space of some users, it is necessary to shrink available storage space of other users, which results in a large amount of calculation and judgment operations that are difficult to be manually implemented by an administrator. Moreover, since adjusting available storage space of a user on a filesystem will bring a lot of workload to an administrator, the request of adjustment from a user often cannot be processed quickly and the adjustment cannot be guaranteed in an effective manner.

SUMMARY

Embodiments of the present disclosure provide a method, device and computer program product for adjusting storage space.

In accordance with the first aspect of the present application, it provides a method for adjusting storage space. The method including: receiving a request for adjusting available storage space of a user in a filesystem from a first size to a second size; determining whether to allow to adjust the available storage space based on the request; and in response to allowing to adjust the available storage space, adjusting the available storage space to the second size.

In accordance with the second aspect of the present application, it provides a device for adjusting storage space. The device including: at least one processing unit; and at least one memory coupled to the at least one processing unit and storing instructions for execution by the at least one processing unit, the instructions, when executed by the at least one processing unit, causing the device to perform an act, the act including: receiving a request for adjusting available storage space of a user in a filesystem from a first size to a second size; determining whether to allow to adjust the available storage space based on the request; and in response to allowing to adjust the available storage space, adjusting the available storage space to the second size.

In accordance with the third aspect of the present application, it provides a computer program product being tangibly stored on a non-transitory computer readable medium and including machine executable instructions that, when being executed, causing a machine to perform steps of the method according to the first aspect.

The Summary of the invention is provided to introduce a selection of concepts in a simplified form, which are further described in the Detailed Description. The Summary is neither intended to identify key features or essential features of the present disclosure nor to limit the scope of the present invention.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals generally denote the same components.

In the drawings, the same or corresponding reference numerals represent the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While the preferred embodiment of the present invention has been shown in the drawings, it should be understood that the present disclosure may be embodied in various forms and not limited by the embodiments set forth herein. Rather, the embodiments are provided so that this disclosure will be thorough and complete, and the scope of the disclosure may be fully conveyed to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be understood as "at least one other embodiment." The terms "first," "second," and the like may refer to different or identical objects. Other explicit and implicit definitions may be included below.

As discussed above in Background, with conventional filesystems, an administrator needs to handle a lot of the same and similar work and process a large amount of calculation and judgment operations. As a result, the request of adjustment from a user often cannot be processed quickly and the adjustment cannot be guaranteed in an effective manner.

In order to at least partially solve one or more of the above problems and other potential problems, an embodiment of the present disclosure proposes a method for adjusting storage space. With this method, when a user sends a request for adjusting available storage space of the user on a filesystem, there is no need for the administrator to process the request. Rather, the filesystem automatically processes the request based on contents included in the request, which can further possess a request having various complex conditions. As a result, an administrator can be free from operations for adjusting available storage space and a quick response and correctness can be guaranteed for the request for adjusting the storage space of a user.

Figure 1:
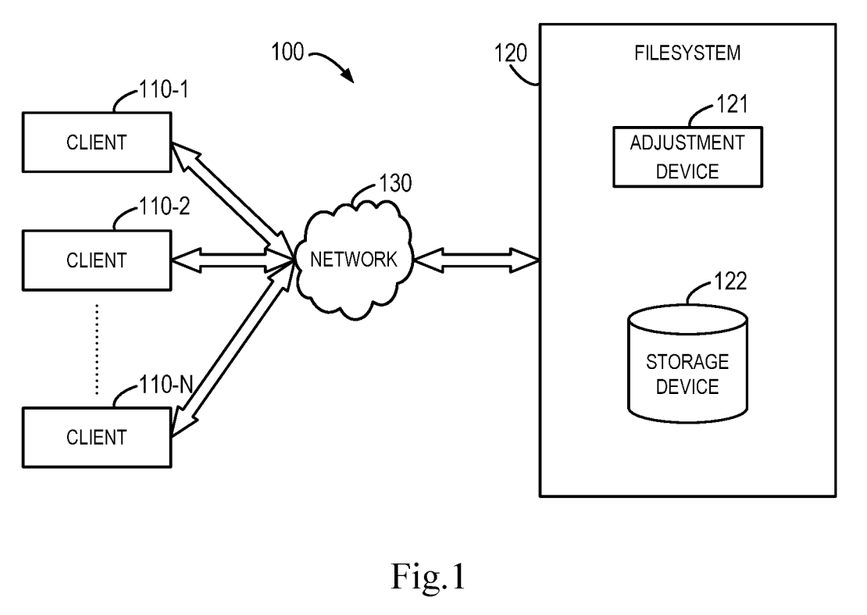
FIG. 1 is a diagram illustrating a data storage environment 100 in which a method for adjusting storage space in some embodiments of the present disclosure herein may be implemented.

FIG. 1 is a diagram illustrating a data storage environment 100 in which a method for adjusting storage space in some embodiments of the present disclosure herein may be implemented. As shown in FIG. 1, the data storage environment 100 includes a plurality of clients 110-1, 110-2 . . . 110-N (hereinafter collectively referred to as clients 110), a filesystem 120, and a network 130. The client 110 is used by a user for accessing data and performing other operations on the data in the filesystem 120. The filesystem 120 includes a device 121 for adjusting storage space (also referred to herein as an adjustment device 121) and a storage device 122, wherein the storage device 122 may be a combination of a plurality of different storage devices and the storage device 122 provides storage space in the filesystem 120 available to the client 110. It should be noted that the data storage environment 100 is extensible, which can include more clients 110 and even more filesystems 120. The filesystem 120 may include more adjustment devices 121 and storage devices 122, making it possible to meet the needs of more users accessing and manipulating (e.g., copying) data in the filesystem 120 at the same time and to provide users with greater storage space. For the sake of simplicity, only a filesystem 120 and a network 130 are shown in FIG. 1 and the filesystem 120 includes only one adjustment device 121 and one storage device 122.

In the data storage environment 100, a user uses the client 110 to access and manipulate data in the filesystem 120 through the network 130 and the adjustment device 121 of the filesystem 120 accesses and manipulates data stored in the storage device 122 in response to requests from the user.

According to the embodiment of the present disclosure, the user uses the client 110 to send a request for adjusting the available storage space of the user in the filesystem 120 to the adjustment device 121 of the filesystem 120 through the network 130, then the adjustment device 121 receives this request and processes this request and adjusts the available storage space provided by the storage device 122 for the user according to the request from the user.

Figure 2:
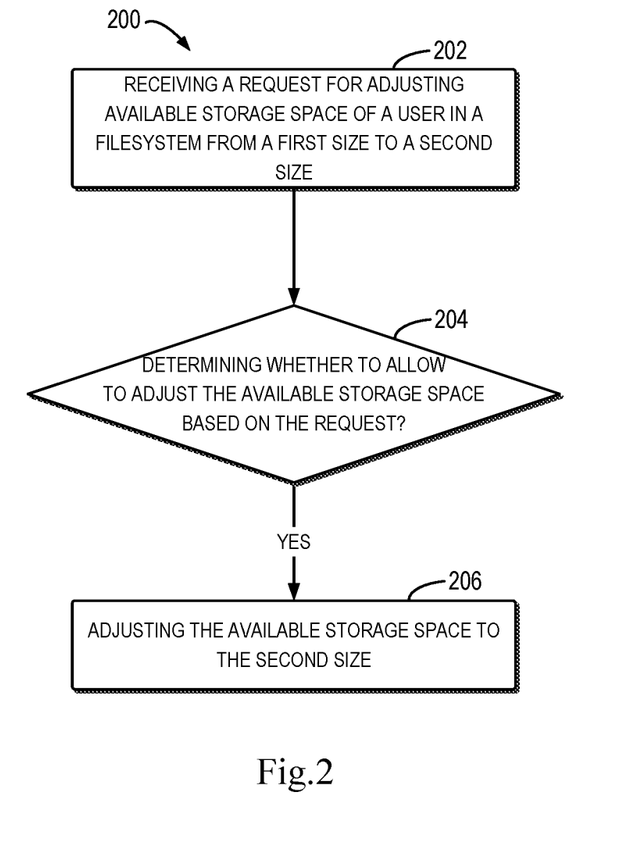
FIG. 2 is a flowchart illustrating a method 200 of adjusting storage space according to an embodiment of the present disclosure.

FIG. 2 is a flowchart illustrating a method 200 of adjusting storage space according to an embodiment of the present disclosure. Specifically, the method 200 may be performed by the adjustment device 121. It should be understood that the method 200 may further include additional steps not shown and/or omit steps shown. The scope of the present disclosure is not limited in this regard.

At block 202, the adjustment device 121 receives a request sent by the user through the client 110-1 of adjusting the available storage space in the filesystem 120 from a first size to a second size. In order to be convenient for a user to send a request easier to handle, the client 110-1 may support a user to select a pre-configured content for a request in a pull-down menu, thereby making it easier for the user to make a request. The pre-configured content of a request can include whether the adjustment refers to expanding or shrinking the available storage space, whether the adjustment is temporary or permanent, the size of the expanded or shrinked available storage space to which the request is directed, when to start the adjustment, and how long the newly changed available storage space needs to be kept, whether to restore the available storage space to the original size or to another size after the adjustment is completed, and the operations to be done when it is difficult to restore the space to the original size or to another size as a result of too much storage space used by the user at the end of the adjustment.

According to the embodiment of the present disclosure, the first size refers to the available storage space currently allocated to the user, which is initially allocated by the adjustment device 121 by default or previously allocated according to the request from a user.

At block 204, the adjustment device 121 determines whether to allow adjustment of the available storage space based on the request received at block 420. According to an embodiment of the present disclosure, if the request indicates that a user wants to shrink the available storage space, the adjustment device 121 may directly determine that the available storage space is allowed to be adjusted; if the request indicates that the user wants to expand the available storage space, the adjustment device 121 may determine whether the adjustment of the available storage space is allowed based on at least one of total storage space of the filesystem 120, available storage space of other users and a request from another user of adjusting the available storage space.

At block 206, the adjustment device 121 adjusts the available storage space of the user in the filesystem 120 from the first size to the second size in response to the determination at the block 204 that adjustment of the available storage space is allowed. According to the embodiment of the present disclosure, after the aforementioned adjustment is performed, the adjustment device 121 may issue an indication to the user that the adjustment was successful through the client 110-1. According to the embodiment of the present disclosure, after determining that the adjustment of the available storage space is allowed, the adjustment device 121 may not immediately adjust the available storage space, but may make it available at the start time of adjusting the available storage space specified by the user in the request.

According to an embodiment of the present disclosure, the adjusting device 121 may adjust the available storage space based on a request from a user in the form of a parameter. For example, the adjustment device 121 may first collect various parameters from a request from the user, for example, the first size of the available storage space (the size of the available storage space allocated to the user), the second size of the available storage space (the size of the available storage space which the user wants through adjustment), the start point of the adjustment, the end point of the adjustment (or the retention time of the adjustment), the size of the available storage space after the adjustment, the operations to be done in response to a determination that adjustment is not allowed, etc. Then, the adjustment device 121 may use the aforementioned parameters and, for example, the size of the total storage space of the filesystem 120, to determine whether to allow adjustment of the available storage space. Finally, the adjusting device 121 may adjust the available storage space according to the aforementioned parameters in response to determining to adjust the available storage space.

Figure 3:
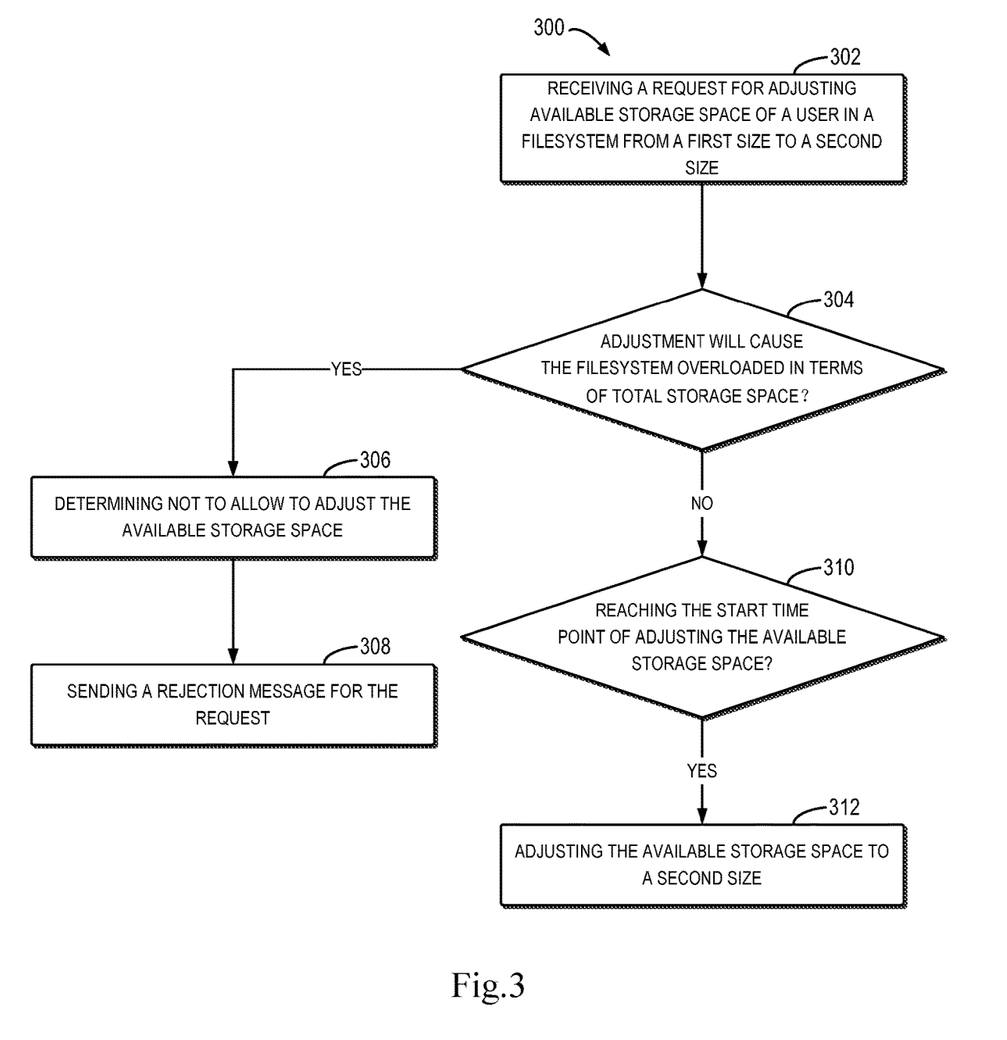
FIG. 3 is a flowchart illustrating a method 300 of adjusting storage space according to an embodiment of the present disclosure.

FIG. 3 is a flowchart illustrating a method 300 of adjusting storage space according to an embodiment of the present disclosure. Specifically, the method 300 can be understood as an extended version of the method 200, which can also be performed by the adjustment device 121. It should be understood that the method 300 may further include additional steps not shown and/or omit steps shown. The scope of the present disclosure is not limited in this regard.

At block 302, the adjustment device 121 receives a request sent by a user through the client 110-1 of adjusting available storage space of the user in the filesystem 120 from a first size to a second size. The operation described at a box 302 is the same as the operation described at a box 202, which is not repeated here.

At block 304, the adjustment device 121 determines whether adjusting the available storage space is allowed based on whether adjusting the available storage space to a second size will cause the filesystem 120 overloaded.

As mentioned earlier, if the request indicates that the user wants to shrink the available storage space, the adjustment device 121 may directly determine that the available storage space is allowed to be adjusted. According to an embodiment of the present disclosure, if the request indicates that the user wants to expand the available storage space, the adjustment device 121 may first calculate the difference between the first size and the second size as the first difference value, and then calculate the difference between a sum of available storage space allocated to all users in the filesystem 120 and the total storage space of the filesystem 120 as the second difference value, and finally determine whether adjusting the available storage space to the second size will cause the filesystem 120 overloaded by comparing the first difference value with the second difference value.

According to an embodiment of the present disclosure, the first size may be specified by a user in a request, or may be known to the adjustment device 121 according to the size of the available storage space allocated to the user by the adjustment device 121. If the adjustment device 121 does not allocate storage space to the user, the adjustment device 121 may default the first size to zero.

When the adjustment device 121 determines that adjusting the available storage space to the second size will cause the 120 overloaded in terms of total storage space, the method 300 proceeds to block 306; when the adjustment device 121 determines that adjusting the available storage space to the second size will not cause the 120 overloaded in terms of total storage space, the method 300 proceeds to block 310.

At block 306, since the adjustment device 121 determines at the block 304 that adjusting the available storage space to the second size will cause the filesystem 120 overloaded in terms of the total storage space, and thereby the adjustment device 121 determines that the adjustment of the available storage space is not allowed, i.e. the request from a user is not accept.

At block 308, the adjustment device 121 sends a rejection message to the user via the client 110-1. It should be understood that block 308 is optional. The adjustment device 121 may not send any message to the user after determining that the adjustment of the available storage space is not allowed.

At block 310, since the adjusting device 121 determines at the block 304 that adjusting the available storage space to the second size will cause the filesystem 120 overloaded in terms of the total storage space, the adjusting device 121 further determines whether it reaches the start time of the adjustment of the available storage space.

According to the embodiment of the present disclosure, the aforementioned start time may be indicated by a user in a request sent to the adjustment device 121, or may be specified in advance by the user or a default start time point of the adjustment device 121. It should be understood that this step documented at the block 310 is optional. If the user does not indicate any start time point in the request and the user does not specify or adjust the default start time point of the device 121 in advance, the adjustment device 121 may immediately performs subsequent operations upon the determination that adjusting the available storage space to the second size will cause the filesystem 120 overloaded in terms of the total storage space.

When the adjustment device 121 determines that it reaches the start time point of adjusting the available storage space, the method 300 proceeds to block 312. When the adjustment device 121 determines that it does not reach the start time point of adjusting the available storage space, the adjustment device 121 continues to wait for the start of the start time point.

At block 312, the adjustment device 121 adjusts the available storage space of a user in the filesystem 120 from the first size to the second size. The operation described at the block 302 is the same as the operation described in the foregoing box 206, which is not described herein again.

If the user indicates in the request that the adjustment of the available storage space is permanent, the adjustment device 121 does not need to perform other operations after a block 206 of the method 200 and a block 312 of the method 300. If the user indicates in the request that the adjustment of the available storage space is temporary, the adjustment device 121 needs to perform subsequent operations. These operations are described below with reference to FIGS. 4 and 5.

Figure 4:
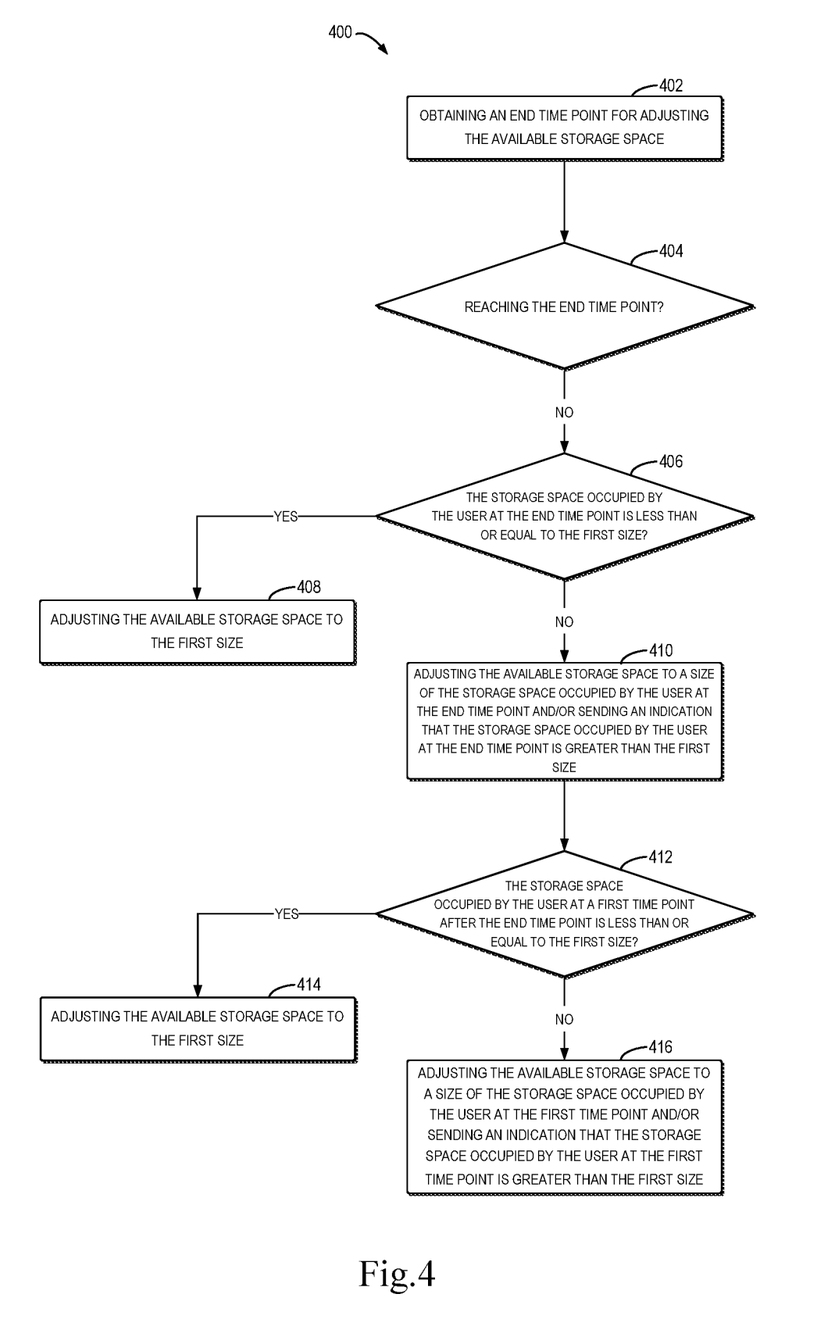
FIG. 4 is a flowchart illustrating a method 400 of adjusting storage space according to an embodiment of the present disclosure.

FIG. 4 is a flowchart illustrating a method 400 of adjusting storage space according to an embodiment of the present disclosure. The method 400 illustrates various operations of restoring the available storage space to the original size at a certain time point after adjusting the available storage space, which can also be performed by the adjustment device 121. It should be understood that the method 400 may further include additional steps not shown and/or omit steps shown. The scope of the present disclosure is not limited in this regard.

At block 402, the adjustment device 121 determines an end time point to adjust the available storage space to the original size (i.e., the first size). According to an embodiment of the present disclosure, the foregoing end time point may be indicated by a user in a request sent to the adjustment device 121, or may be specified in advance by the user or a default end time point of the adjustment device 121.

At block 404, the adjustment device 121 determines whether it reaches the end time point of adjusting the available storage space. When the adjustment device 121 determines that it reaches the end time point of adjusting the available storage space, the method 400 proceeds to block 406; when the adjustment device 121 determines that it does not the end time point of adjusting the available storage space, the adjustment device 121 continues to wait for arrival of the end time point.

At block 406, the adjustment device 121 determines whether the storage space occupied by the user in the filesystem 120 at the end time point is less than or equal to the first size.

It should be understood the block 406 is optional. This is because if the request indicates that the user wants to shrink the available storage space and the first size is larger than the second size, the storage space occupied by the user at the end time must be less than the first size as actual storage space of the user is not allowed to exceed the available storage space. At this time, the adjustment device 121 does not need to perform the operations of the block 406 and subsequent operations of blocks 408 to 416, but only needs to adjust the available storage space to the first size at the end time. Therefore, the block 406 is directed to a case where the request indicates that the user wants to expand the available storage space.

At block 406, when the adjustment device 121 determines that the storage space occupied by the user at the end time point is less than or equal to the first size, the method 400 proceeds to the block 408; when the adjustment device 121 determines that the storage space occupied by the user at the end time point is greater than the first size, the method 400 proceeds to the block 410.

At block 408, the adjustment device 121 adjusts the available storage space to a first size. This is because the storage space occupied by the user at the end time point is less than or equal to the first size, so adjusting the available storage space to the first size will not adversely affect the data in the storage space occupied by the user.

At block 410, since the storage space occupied by the user at the end time point is larger than the first size, if the available storage space is adjusted to the first size, the data in the storage space occupied by the user may be lost. The device 121 performs at least one of the following: adjusting the available storage space to the size of the storage space occupied by the user at the end time point and sending an indication that the storage space occupied by the user at the end time point is greater than the first size.

According to the embodiment of the present disclosure, the specific operation performed by the adjustment device 121 at the block 410 may be indicated by the user in the request sent to the adjustment device 121, or may be specified in advance by the user or the default act of the adjustment device 121.

According to an embodiment of the present disclosure, the adjustment device 121 may send an indication that the storage space occupied by the user at the end time point is larger than the first size to at least one of the following: an administrator of the filesystem 120 and a user who sent the request. Sending instructions to whom may be specifically indicated by the user in the request sent to the adjustment device 121 or may be pre-indicated by the user or may be a default object of the adjustment device 121.

At block 412, the adjusting device 121 determines whether the storage space occupied by the user in the filesystem 120 at the first time point after the end time point is less than or equal to the first size. The reason for performing the operation of block 412 is that the adjustment device 121 fails to adjust the available storage space to the first size that needs to be adjusted at the end time point, and therefore the adjustment device 121 needs to continue to adjust the available storage space to the first size after the end time point.

At block 412, when the adjustment device 121 determines that the storage space occupied by the user at the first time point is less than or equal to the first size, the method 400 proceeds to the block 414; when the adjustment device 121 determines that the storage space occupied by the user at the first time point is greater than the first size, the method 400 proceeds to the block 416.

At block 414, the adjustment device 121 adjusts the available storage space to a first size.

At block 416, the adjustment device 121 performs at least one of the following: adjusting the available storage space to the size of the storage space occupied by the user at the first time point, sending an indication that the storage space occupied by the user at the first time point greater than the first size.

The operations of blocks 412, 414, and 416 are similar to the operations described above with respect to blocks 406, 408, and 410, which are not repeated here.

It should be understood that after the operation of block 416 is completed, as the adjustment device 121 has not yet achieved the adjustment of the available storage space to the first size, the adjustment device 121 may continue to execute the operation of blocks 412 and 414 and 416 in a loop until the available storage space is adjusted to the first size.

Figure 5:
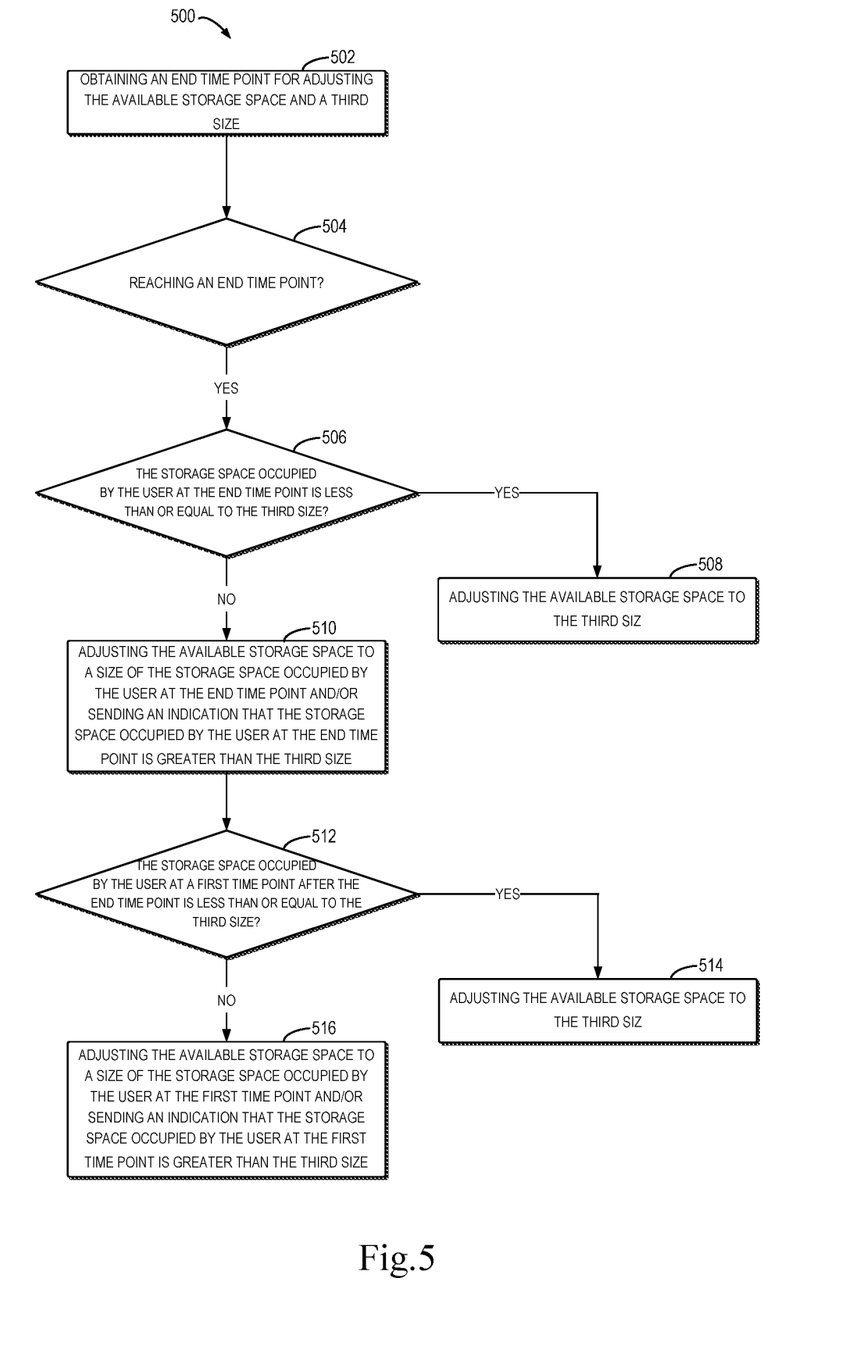
FIG. 5 is a flowchart illustrating a method 500 of adjusting storage space according to an embodiment of the present disclosure.

FIG. 5 is a flowchart illustrating a method 500 of adjusting storage space according to an embodiment of the present disclosure. Specifically, the method 500 shows various operations of adjusting the available storage space to a third size different from the first size and the second size at a certain time point after adjusting the available storage space, which can also be adjusted by an adjusting device 121. It should be understood that the method 500 may further include additional steps not shown and/or omit steps shown. The scope of the present disclosure is not limited in this regard.

At block 502, the adjustment device 121 determines an end time point of adjusting the available storage space to a third size and the third size. According to the embodiment of the present disclosure, the foregoing end time point and the third size may be indicated by the user in a request sent to the adjustment device 121, or may be specified by the user in advance or the default end time point and the third size of the adjustment device 121.

At block 504, the adjustment device 121 determines whether it reaches the end time point of adjusting the available storage space. When the adjustment device 121 determines that it reaches the end time point of adjusting the available storage space, the method 500 proceeds to block 506; when the adjustment device 121 determines that it does not reach the end time point of adjusting the available storage space, the adjustment device 121 continues to wait for arrival of the end time point.

At block 506, the adjustment device 121 determines whether the storage space occupied by the user in the filesystem 120 at the end time point is less than or equal to the third size. According to an embodiment of the present disclosure, the third size may be arbitrary, and it may be smaller than the first size, larger than the first size, smaller than the second size or larger than the second size. When the adjustment device 121 determines that the storage space occupied by the user at the end time point is less than or equal to the third size, the method 500 proceeds to block 508; when the adjustment device 121 determines that the storage space occupied by the user at the end time point is greater than the third size, the method 500 proceeds to block 510.

At block 508, the adjusting device 121 adjusts the available storage space to a third size. This is because the storage space occupied by the user at the end time point is less than or equal to the third size, so adjusting the available storage space to the third size will not have an adverse impact on the data in the storage space occupied by the user.

At block 510, since the storage space occupied by the user at the end time point is larger than the third size, adjusting the available storage space to the third size may result in the loss of data in the storage space occupied by the user. At this time, the adjusting device 121 performs at least one of the following: adjusting the available storage space to the size of the storage space occupied by the user at the end time point, sending an indication that the storage space occupied by the user at the end time point is larger than the third size.

According to an embodiment of the present disclosure, which operation the adjustment device 121 specifically performs at the block 510 may be indicated by the user in a request sent to the adjustment device 121, or may be specified by the user in advance or may be performed by default operations of the adjustment device 121.

According to an embodiment of the present disclosure, the adjustment device 121 may send an indication that the storage space occupied by the user at the end time point is larger than the third size to at least one of the following: an administrator of the adjustment device 121 and a user who sent the request. Sending instructions to whom may be specifically indicated by the user in the request sent to the adjustment device 121 or may be pre-indicated by the user or may be a default object of the adjustment device 121.

At block 512, the adjustment device 121 determines whether the storage space occupied by the user in the filesystem 120 at a first time point after the end time point is less than or equal to a third size. The reason for performing the operation of block 512 is that the adjustment device 121 fails to adjust the available storage space to a third size that needs to be adjusted at the end time point, so it is necessary to continue to try to adjust the available storage space to the third size after the end time point.

At block 512, when the adjustment device 121 determines that the storage space occupied by the user at the first time point is less than or equal to a third size, the method 500 proceeds to the block 514; when the adjustment device 121 determines that the storage space occupied by the user at the first time point is greater than the third size, the method 500 proceeds to the block 516.

At block 514, the adjustment device 121 adjusts the available storage space to the third size.

At block 516, the adjusting device 121 performs at least one of the following: adjusting the available storage space to the size of the storage space occupied by the user at the first time point, sending an indication that the storage space occupied by the user at the first time point is greater than the third size.

The operations of blocks 512, 514, and 516 are similar to the operations described above with respect to blocks 506, 508, and 510, which are not repeated here.

According to an additional embodiment of the present disclosure, when the adjustment device 121 attempts to adjust the available storage space of the user to the size of the storage space currently occupied by the user, if the user is continuing to perform an operation that causes the currently occupied storage space to become larger (For example, writing, copying, etc.), the operation performed by the user fails and the adjustment device 121 may send a message to the user in response to the failure.

According to an additional embodiment of the present disclosure, after the adjustment device 121 temporarily adjusts the available storage space of an user after receiving a request from the user, the adjustment device 121 can receive the request from a user to further adjust the available storage space as long as the latter adjustment is determined as allowable by the adjustment device 121.

According to an additional embodiment of the present disclosure, when the adjustment device 121 temporarily or permanently expands the available storage space of the user after receiving a request from an user, for the purpose of accepting the request, the adjustment device 121 may shrink the available storage space of other users according to the allocated available storage space of other users and the occupied storage space. This operation needs to ensure that it does not affect the normal use of the storage space of the filesystem 120 by other users.

According to the embodiment of the present disclosure, the adjustment of the size of the available storage space may be performed in units of GB or TB and the adjustment time may be performed in units of hours, days, or months.

The above describes the data storage environment 100 in which the method for adjusting storage space in some embodiments of the present disclosure can be implemented and related content of methods 200, 300, 400, and 500 for adjusting storage space in some embodiments of the present disclosure with reference to FIGS. 1 to 5. It should be understood that the above description is intended to better show the disclosure and not intended to limit the scope in any way.

It should be understood that the number of various elements and the size of the physical quantities used in the above-mentioned drawings of the present disclosure are merely examples and are not intended to limit the protection scope of the present disclosure. The above-mentioned number and size can be arbitrarily set as needed without affecting the normal implementation of the embodiments of the present disclosure.

Figure 6:
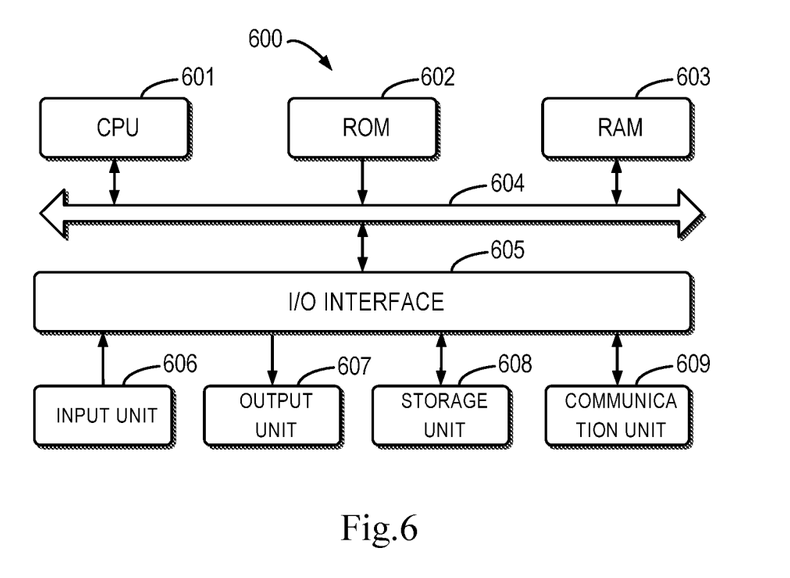
FIG. 6 is a diagram illustrating an example device 600 for implementing an embodiment of the present disclosure.

FIG. 6 is a block diagram illustrating an example device 600 used to implement embodiments of the present disclosure. As shown in FIG. 6, the device 600 includes a central processing unit (CPU) 601 that may perform various appropriate acts and processing based on computer program instructions stored in a read-only memory (ROM) 602 or computer program instructions loaded from a storage section 608 to a random access memory (RAM) 603. In the RAM 603, there further store various programs and data needed for operations of the device 600. The CPU 601, ROM 602 and RAM 603 are connected to each other via a bus 604. An input/output (I/O) interface 605 is also connected to the bus 604.

The following components in the device 600 are connected to the I/O interface 605: an input 606 such as a keyboard, a mouse and the like; an output unit 607 including various kinds of displays and a loudspeaker, etc.; a memory unit 608 including a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the methods 200, 300, 400 and 500, may be executed by the processing unit 601. For example, in some embodiments, the methods 200, 300, 400 and 500 may be implemented as a computer software program that is tangibly embodied on a machine readable medium, e.g., the storage unit 608. In some embodiments, part or all of the computer programs may be loaded and/or mounted onto the device 600 via ROM 602 and/or communication unit 609. When the computer program is loaded to the RAM 603 and executed by the CPU 601, one or more steps of the methods 200, 300, 400 and 500 as described above may be executed.

The present disclosure may be a method, a device, a system and/or a computer program product. The computer program product may include a computer readable storage medium having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable journal logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified journal ical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for adjusting storage space, comprising:
    receiving, by a processor, a request for adjusting available storage space of a user in a filesystem from a first size to a second size;
    determining, by the processor, whether to allow to adjust the available storage space based on the request; and
    in response to allowing to adjust the available storage space, adjusting, by the processor, the available storage space to the second size,
    wherein adjusting the available storage space to the second size comprises:
        obtaining a start time point for adjusting the available storage space from the request; and
        adjusting the available storage space to the second size at the start time point, and
    wherein determining whether to allow to adjust the available storage space comprises:
        determining, based on whether adjusting the available storage space to the second size will cause the filesystem to become overloaded in terms of total storage space, whether to adjust the available storage space.

2. The method according to claim 1, further comprising:
    in response to determining that adjusting the available storage space to the second size would cause the filesystem to become overloaded in terms of total storage space, rejecting the request for the processor to adjust the available storage space.

3. The method according to claim 2, further comprising:
    sending a rejection message for the request.

4. The method according to claim 1, further comprising:
    obtaining an end time point for adjusting the available storage space from the request; and
    adjusting the available storage space to the first size at the end time point.

5. The method of claim 4, wherein adjusting the available storage space to the first size comprises:
    in response to determining that the storage space occupied by the user in the filesystem at the end time point is less than or equal to the first size, adjusting the available storage space to the first size.

6. The method according to claim 1, further comprising:
    obtaining an end time point for adjusting the available storage space from the request; and
    in response to determining that the storage space occupied by the user in the filesystem at the end time point is greater than the first size, performing at least one of the following:
        adjusting the available storage space to a size of the storage space occupied by the user at the end time point; and
        sending an indication that the storage space occupied by the user at the end time point is greater than the first size.

7. The method according to claim 6, further comprising:
    in response to determining that the storage space occupied by the user in the filesystem at a first time point after the end time point is greater than the first size, performing at least one of the following:
        adjusting the available storage space to a size of the storage space occupied by the user at the first time point; and
        sending an indication that the storage space occupied by the user at the first time point is greater than the first size.

8. The method according to claim 1, further comprising:
    obtaining an end time point for adjusting the available storage space and a third size from the request, the third size being different from the first size and the second size; and
    adjusting the available storage space to the third size at the end time point.

9. The method of claim 1, wherein adjusting the available storage space to the second size includes:
    decreasing a second available storage space of a second user based on a difference between the second size and the first size; and
    increasing the available storage space of the user to the second size.

10. A method for adjusting storage space in a filesystem, comprising:
    receiving, by a processor, a request for adjusting available storage space of a user in a filesystem from a first size to a second size, wherein the available storage space is provided on at least one storage device in the filesystem;

determining, by the processor, whether to allow to adjust the available storage space based on the request; and in response to allowing to adjust the available storage space, adjusting, by the processor, the available storage space to the second size, wherein adjusting the available storage space to the second size comprises:

obtaining a start time point for adjusting the available storage space from the request; and adjusting the available storage space to the second size at the start time point, obtaining an end time point for adjusting the available storage space from the request; and in response to determining that the storage space occupied by the user in the filesystem at the end time point is greater than the first size, performing at least one of the following:

adjusting the available storage space to a size of the storage space occupied by the user at the end time point; and sending an indication that the storage space occupied by the user at the end time point is greater than the first size.

11. A device for adjusting storage space, comprising:

at least one processing unit; and at least one memory coupled to the at least one processing unit and storing instructions for execution by the at least one processing unit, the instructions, when executed by the at least one processing unit, causing the device to perform an act, the act comprising:

receiving a request for adjusting available storage space of a user in a filesystem from a first size to a second size;

determining whether to allow to adjust the available storage space based on the request; and in response to allowing to adjust the available storage space, adjusting the available storage space to the second size, wherein adjusting the available storage space to the second size comprises:

obtaining a start time point for adjusting the available storage space from the request; and adjusting the available storage space to the second size at the start time point, and wherein determining whether to allow to adjust the available storage space comprises:

determining, based on whether adjusting the available storage space to the second size will cause the filesystem to become overloaded in terms of total storage space, whether to adjust the available storage space.

12. The device according to claim 11, wherein the acts further comprise:

in response to determining that adjusting the available storage space to the second size would cause the filesystem to become overloaded in terms of total storage space, rejecting the request for the processor to adjust the available storage space.

13. The device according to claim 12, wherein the acts further comprise:

sending a rejection message for the request.

14. The device according to claim 11, wherein the acts further comprise:

obtaining an end time point for adjusting the available storage space from the request; and adjusting the available storage space to the first size at the end time point.

15. The device of claim 14, wherein adjusting the available storage space to the first size comprises:

in response to determining that the storage space occupied by the user in the filesystem at the end time point is less than or equal to the first size, adjusting the available storage space to the first size.

16. The device according to claim 11, wherein the acts further comprise:

obtaining an end time point for adjusting the available storage space from the request; and in response to determining that the storage space occupied by the user in the filesystem at the end time point is greater than the first size, performing at least one of the following:

adjusting the available storage space to a size of the storage space occupied by the user at the end time point; and sending an indication that the storage space occupied by the user at the end time point is greater than the first size.

17. The device according to claim 16, wherein the acts further comprise:

in response to determining that the storage space occupied by the user in the filesystem at a first time point after the end time point is greater than the first size, performing at least one of the following:

adjusting the available storage space to a size of the storage space occupied by the user at the first time point; and sending an indication that the storage space occupied by the user at the first time point is greater than the first size.

18. The device according to claim 11, wherein the acts further comprise:

obtaining an end time point for adjusting the available storage space and a third size from the request, the third size being different from the first size and the second size; and adjusting the available storage space to the third size at the end time point.

19. A computer program product having a non-transitory computer readable medium which stores a set of instructions to adjust storage space; the set of instructions, when carried out by computerized circuitry, causing the computerized circuitry to perform a method of:

receiving a request for adjusting available storage space of a user in a filesystem from a first size to a second size;

determining whether to permit adjustments to the available storage space based on the request; and in response to permitting adjustments to the available storage space, adjusting the available storage space to the second size, wherein adjusting the available storage space to the second size comprises:

obtaining a start time point for adjusting the available storage space from the request; and adjusting the available storage space to the second size at the start time point, and wherein determining whether to allow to adjust the available storage space comprises:
    determining, based on whether adjusting the available storage space to the second size will cause the filesystem to become overloaded in terms of total storage space, whether to adjust the available storage space.

20. The method of claim 9, further comprising identifying a size of unoccupied storage space in the second available storage space,
    wherein determining whether to allow to adjust the available storage space is further based on the size of unoccupied storage space in the second available storage space.

21. The method according to claim 10, further comprising:
    in response to determining that the storage space occupied by the user in the filesystem at a first time point after the end time point is greater than the first size, performing at least one of the following:
        adjusting the available storage space to a size of the storage space occupied by the user at the first time point; and
        sending an indication that the storage space occupied by the user at the first time point is greater than the first size.

\* \* \* \* \*